US012356268B2

(12) United States Patent
Jung et al.

(10) Patent No.: US 12,356,268 B2
(45) Date of Patent: Jul. 8, 2025

(54) TARGET CELL SELECTION FOR MOBILITY

(71) Applicant: LG ELECTRONICS INC., Seoul (KR)

(72) Inventors: Sunghoon Jung, Seoul (KR); Oanyong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 661 days.

(21) Appl. No.: 17/662,900

(22) Filed: May 11, 2022

(65) Prior Publication Data

US 2022/0377638 A1 Nov. 24, 2022

(30) Foreign Application Priority Data

May 12, 2021 (KR) .................. 10-2021-0061457

(51) Int. Cl.
*H04W 36/00* (2009.01)
*H04W 36/08* (2009.01)
*H04W 36/30* (2009.01)

(52) U.S. Cl.
CPC ....... *H04W 36/085* (2023.05); *H04W 36/083* (2023.05); *H04W 36/00838* (2023.05); *H04W 36/304* (2023.05)

(58) Field of Classification Search
None
See application file for complete search history.

(56) References Cited

U.S. PATENT DOCUMENTS 11,757,942 B2 * 9/2023 Raleigh ............... H04L 9/32
12,101,673 B2 * 9/2024 Deenoo ............ H04W 36/0072

FOREIGN PATENT DOCUMENTS

| EP | 3911047 A2 * | 11/2021 | ............ H04W 36/08 |
| WO | WO-2022079344 A1 * | 4/2022 | ........... H04B 7/1851 |
| WO | WO-2022205145 A1 * | 10/2022 | ............ H04W 24/08 |

OTHER PUBLICATIONS

3rd Generation Partnership Project, "Technical Specification Group Radio Access Network; NR; Radio Resource Control (RRC) protocol specification (Release 16)," 3GPP TS 38.331 V16.2.0, Sep. 2020, 921 pages.
3rd Generation Partnership Project, "Technical Specification Group Radio Access Network; NR; User Equipment (UE) procedures in Idle mode and RRC Inactive state (Release 16)," 3GPP TS 38.304 V16.2.0, Sep. 2020, 39 pages.
3rd Generation Partnership Project, "Technical Specification Group Radio Access Network; Solutions for NR to support non-terrestrial networks (NTN) (Release 16)," 3GPP TS 38.821 V16.0.0, Dec. 2019, 140 pages.

* cited by examiner

*Primary Examiner* — Gerald A Smarth
(74) *Attorney, Agent, or Firm* — LEE, HONG, DEGERMAN, KANG & WAIMEY

(57) ABSTRACT

The present disclosure relates to a target cell selection for mobility. According to an embodiment of the present disclosure, a user equipment (UE) may apply an adjustment value to a mobility metric of a cell to obtain an effective mobility metric of the cell. The adjustment value may be related to a remaining service time for one or more cells. The UE may perform a mobility based on the effective mobility metric of the cell.

20 Claims, 11 Drawing Sheets

TARGET CELL SELECTION FOR MOBILITY

CROSS-REFERENCE TO RELATED APPLICATIONS

Pursuant to 35 U.S.C. § 119(a), this application claims the benefit of earlier filing date and right of priority to Korean Patent Application No. 10-2021-0061457, filed on May 12, 2021, the contents of which is hereby incorporated by reference herein in its entirety.

TECHNICAL FIELD

The present disclosure relates to a target cell selection for mobility.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, UE may perform a mobility to one of neighbor cells. For example, the UE may perform an idle mode mobility or a connected mode mobility. The idle mode mobility may be performed based on a frequency priority and/or cell ranking. The connected mode mobility may be performed based on a measurement quality. The frequency priority, cell ranking and measurement quality may be included in a mobility metric. The UE may select the best cell based on the mobility metric, and perform a mobility to the best cell.

SUMMARY

1. Technical Problem

An aspect of the present disclosure is to provide method and apparatus for target cell selection for mobility.

Another aspect of the present disclosure is to provide method and apparatus for a target NTN cell selection for mobility.

2. Technical Solution

According to an embodiment of the present disclosure, a method performed by a user equipment (UE) configured to operate in a wireless communication system comprises: obtaining a mobility metric of a cell among one or more cells; applying an adjustment value to the mobility metric of the cell, wherein the adjustment value is related to a remaining service time for the one or more cells; evaluating a mobility condition for the one or more cells based on the mobility metric of the cell to which the adjustment value is applied; selecting a target cell satisfying the mobility condition among the one or more cells; and performing a mobility to the selected target cell.

According to an embodiment of the present disclosure, the wireless device comprises at least one transceiver, at least processor, and at least one computer memory operably connectable to the at least one processor and storing instructions that, based on being executed by the at least one processor, perform operations. The operations comprise: obtaining a mobility metric of a cell among one or more cells; applying an adjustment value to the mobility metric of the cell, wherein the adjustment value is related to a remaining service time for the one or more cells; evaluating a mobility condition for the one or more cells based on the mobility metric of the cell to which the adjustment value is applied; selecting a target cell satisfying the mobility condition among the one or more cells; and performing a mobility to the selected target cell.

According to an embodiment of the present disclosure, at least one computer readable medium (CRM) stores instructions that, based on being executed by at least one processor, perform operations comprising: obtaining a mobility metric of a cell among one or more cells; applying an adjustment value to the mobility metric of the cell, wherein the adjustment value is related to a remaining service time for the one or more cells; evaluating a mobility condition for the one or more cells based on the mobility metric of the cell to which the adjustment value is applied; selecting a target cell satisfying the mobility condition among the one or more cells; and performing a mobility to the selected target cell.

According to an embodiment of the present disclosure, an apparatus for configured to operate in a wireless communication system (e.g., wireless device) comprises at least processor, and at least one computer memory operably connectable to the at least one processor. The at least one processor is configured to perform operations comprising: obtaining a mobility metric of a cell among one or more cells; applying an adjustment value to the mobility metric of the cell, wherein the adjustment value is related to a remaining service time for the one or more cells; evaluating a mobility condition for the one or more cells based on the mobility metric of the cell to which the adjustment value is applied; selecting a target cell satisfying the mobility condition among the one or more cells; and performing a mobility to the selected target cell.

3. Advantageous Effect

The present disclosure can have various advantageous effects.

For example, the UE can reduce the number of executed mobilities by triggering mobility only when necessary or by prioritizing a target cell that is expected to offer a longer service time. The reduced number of mobilities may be beneficial for reducing interruption caused by mobility or mobility failure.

For example, the UE can perform a mobility towards a cell when the expected/remaining service time of the cell is larger.

For example, the mobility may be promoted when the expected/remaining service time of its serving cell is small or decreasing.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
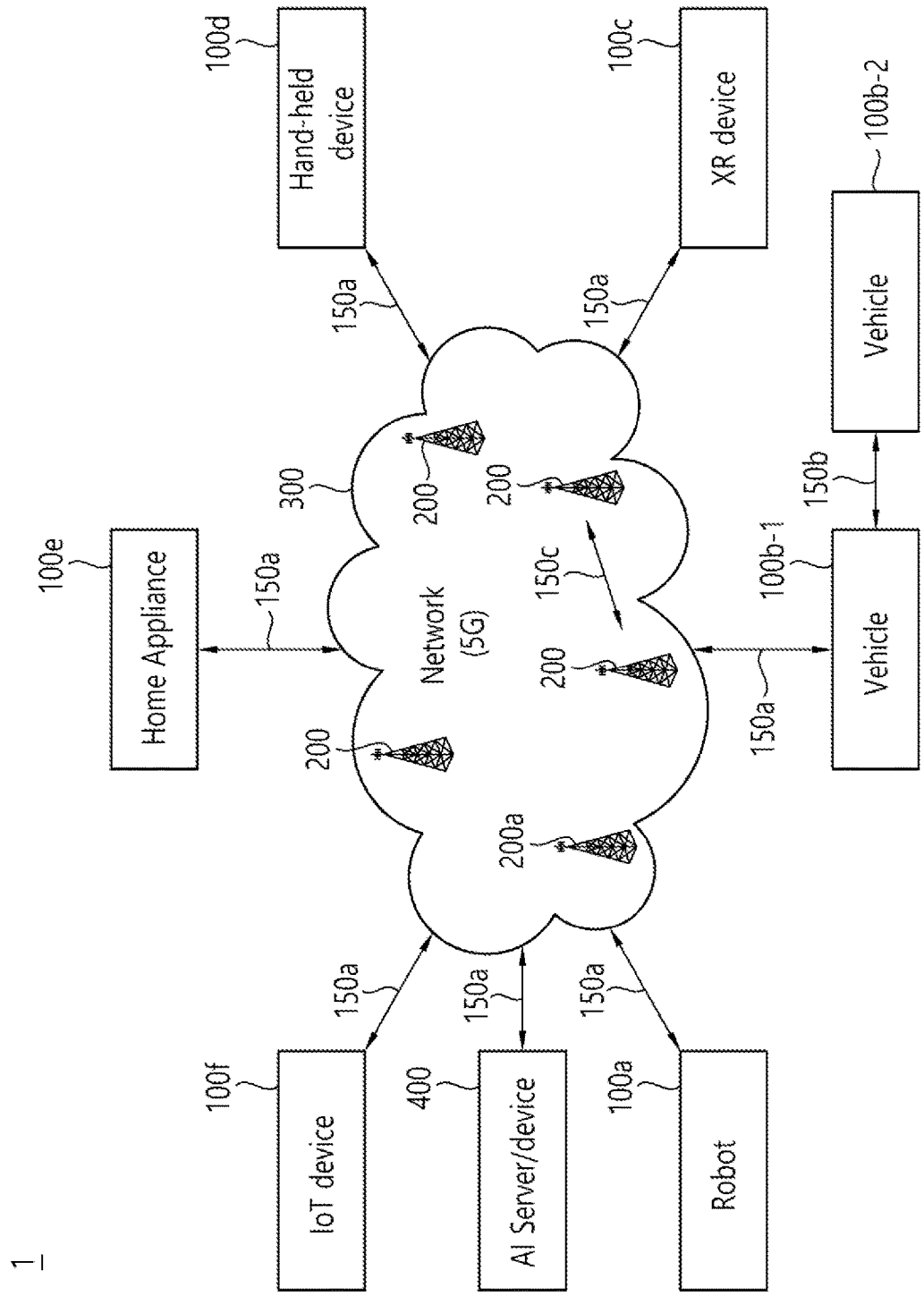
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the abovementioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
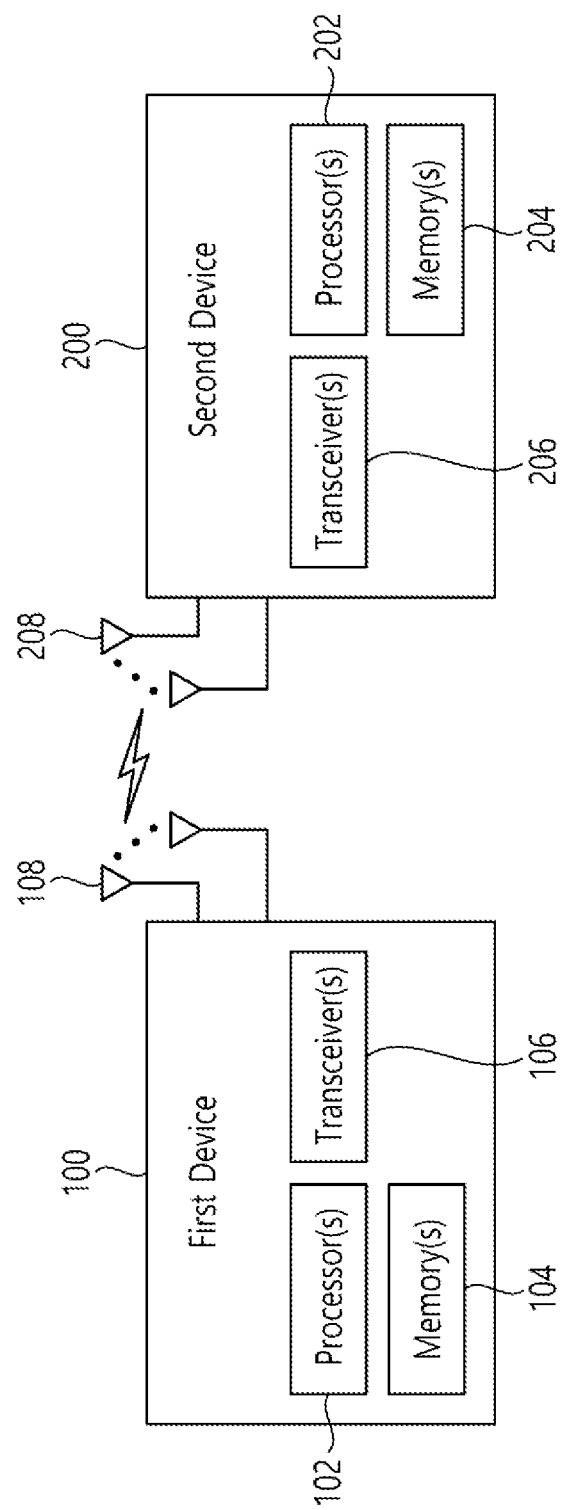
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202 descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
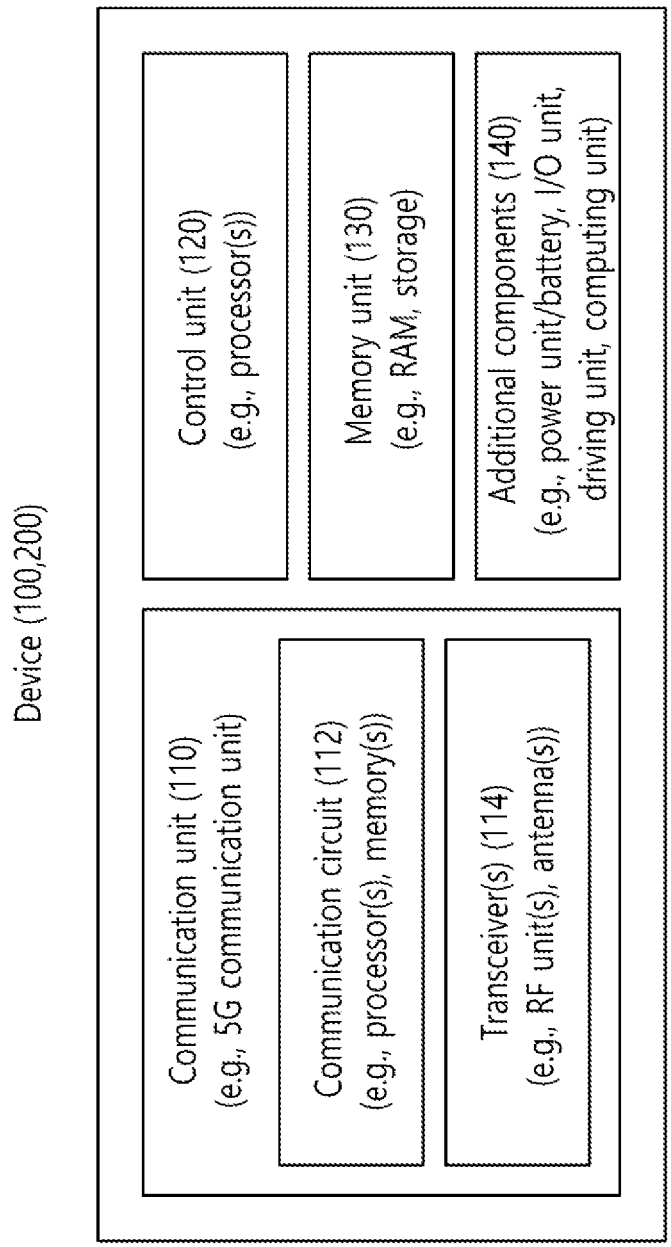
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
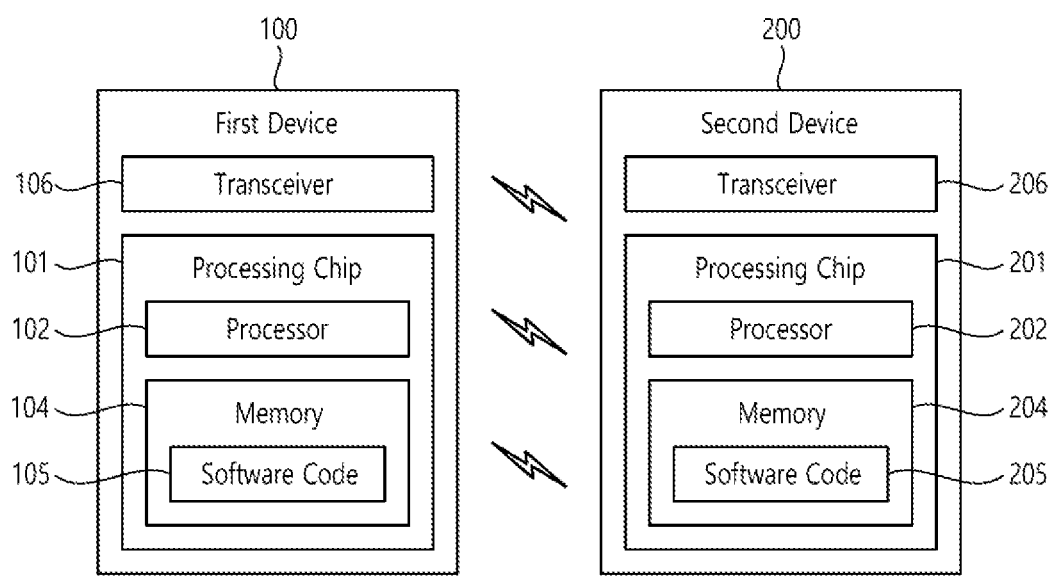
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
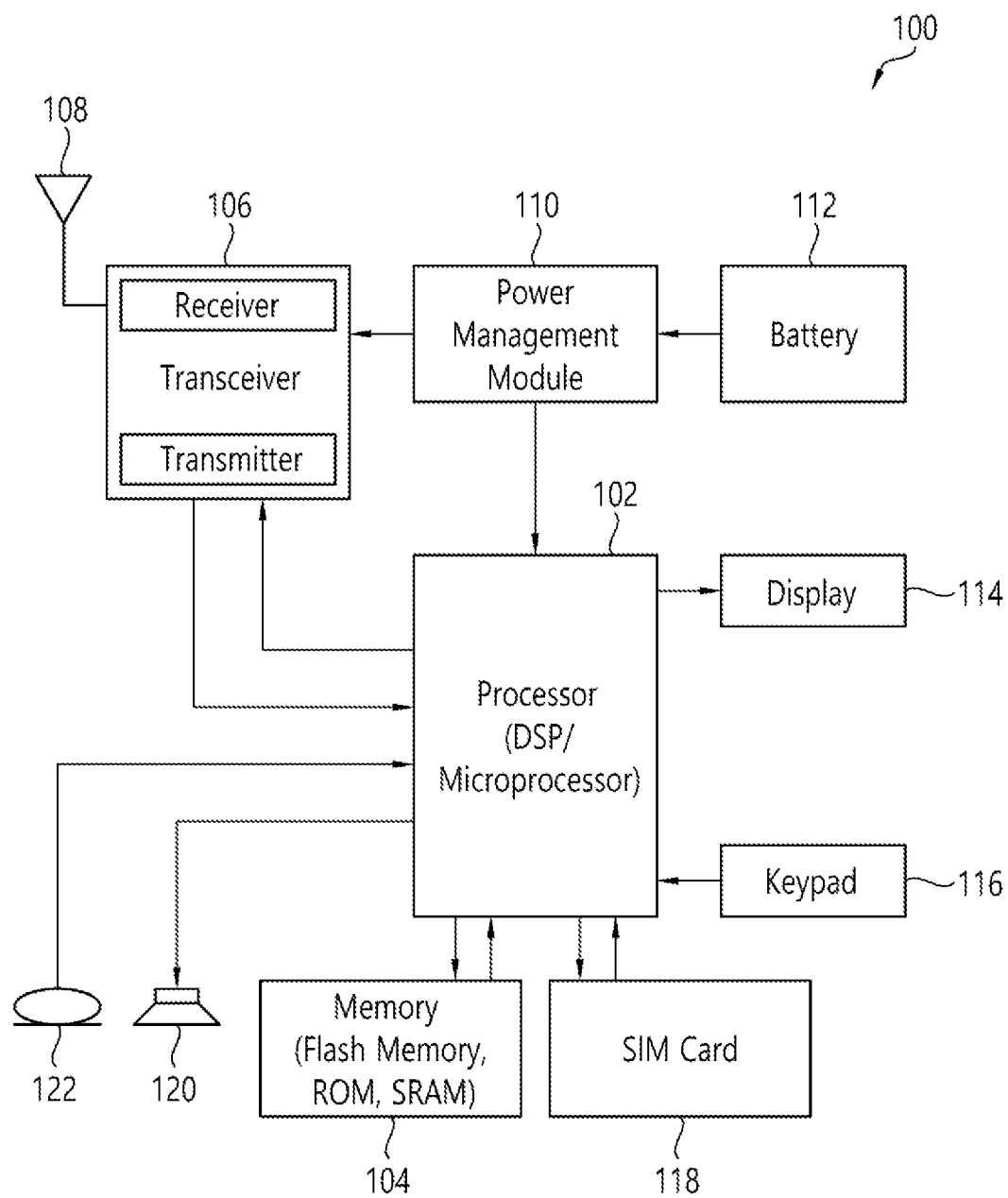
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
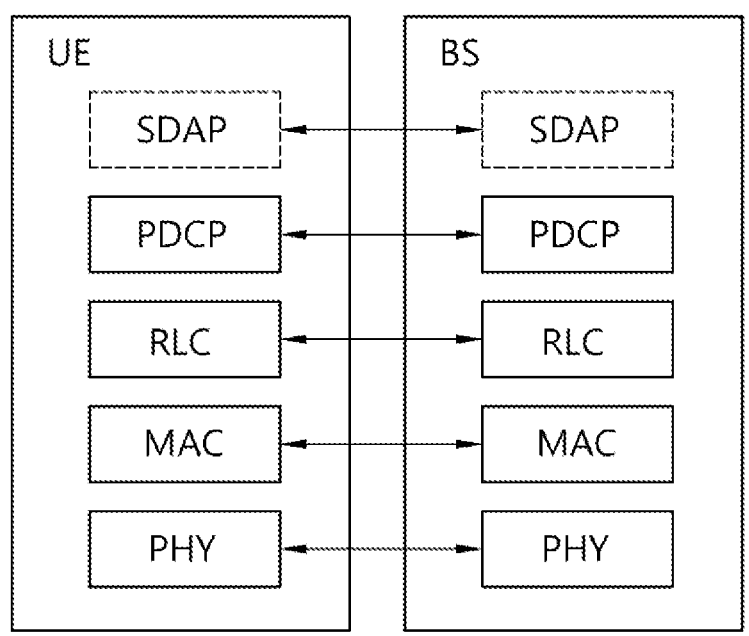
FIGS. 6 and 7 show an example of protocol stacks in a 3GPP based wireless communication system to which implementations of the present disclosure is applied.
Figure 7:
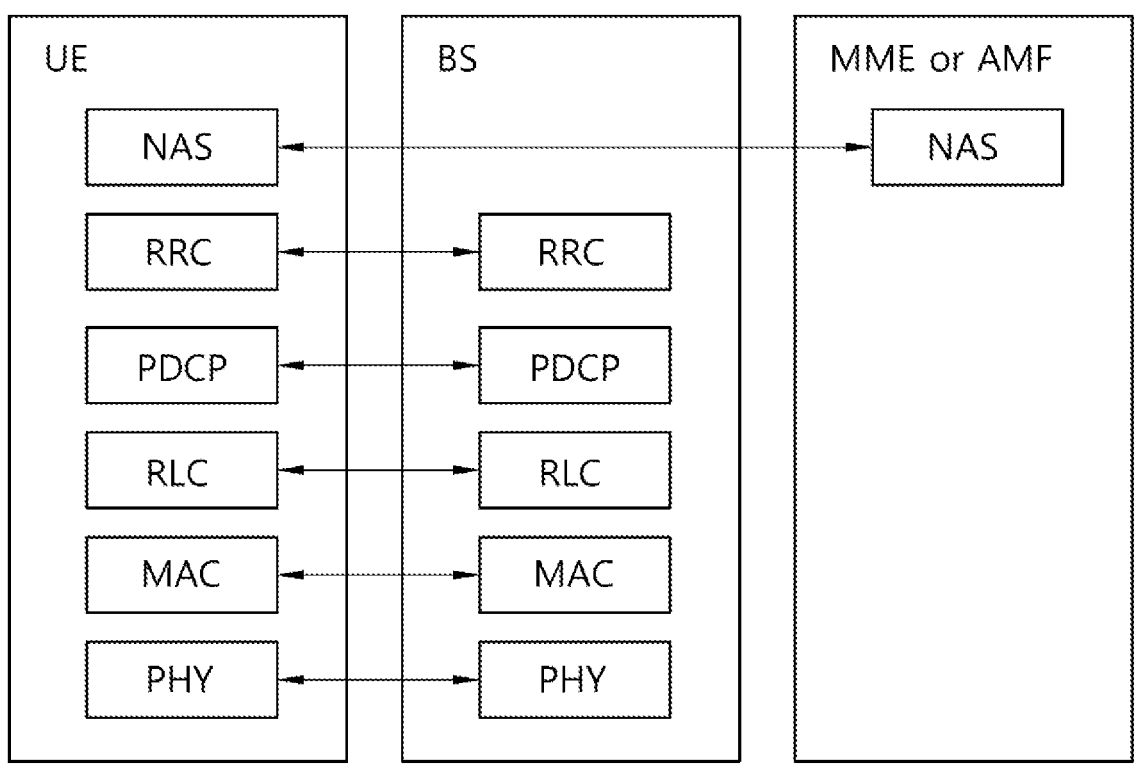

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and anon-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
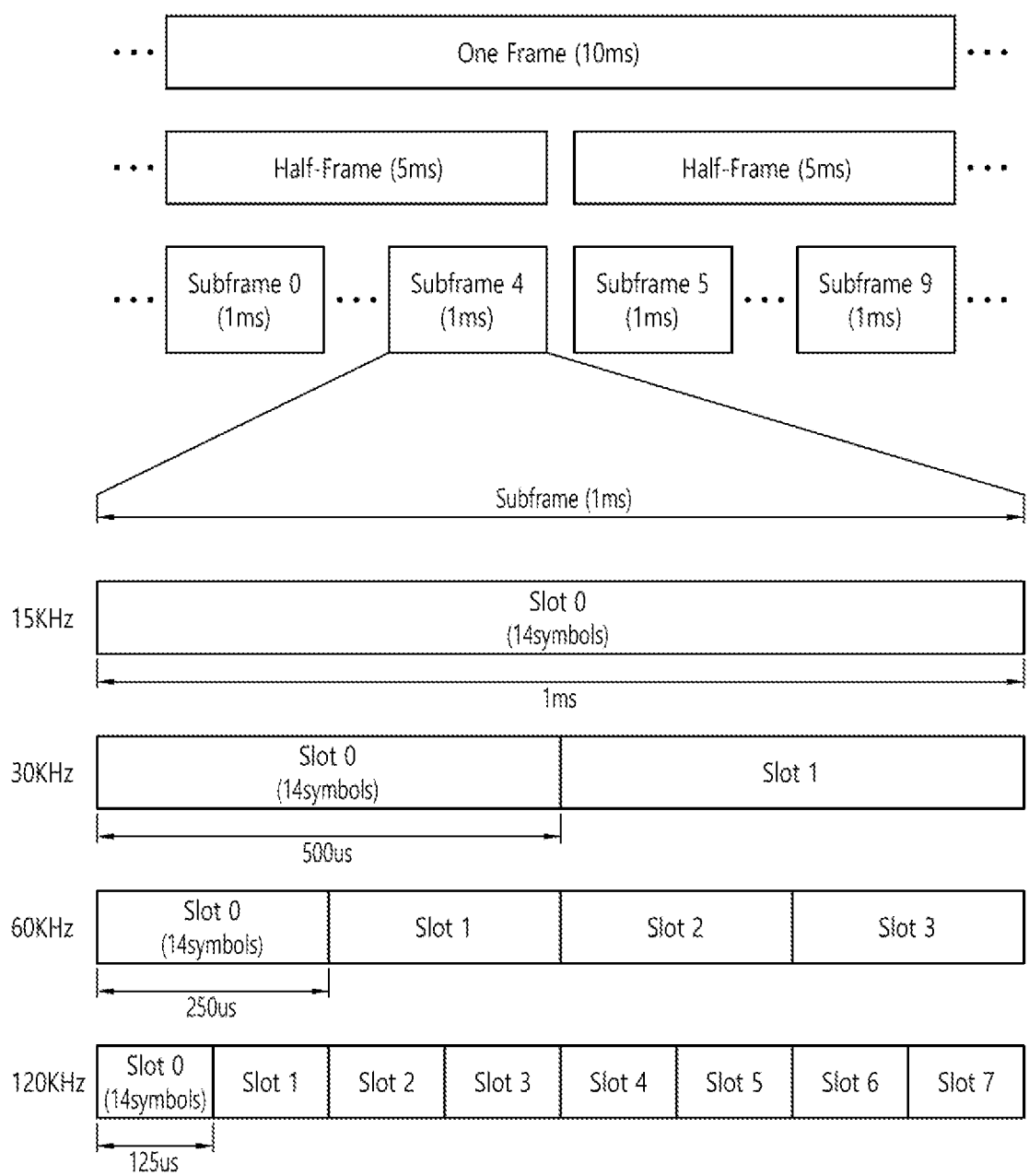
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame,u}_{slot}$ | $N^{subframe,u}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame,u}_{slot}$ | $N^{subframe,u}_{slot}$ |
| --- | --- | --- | --- |
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
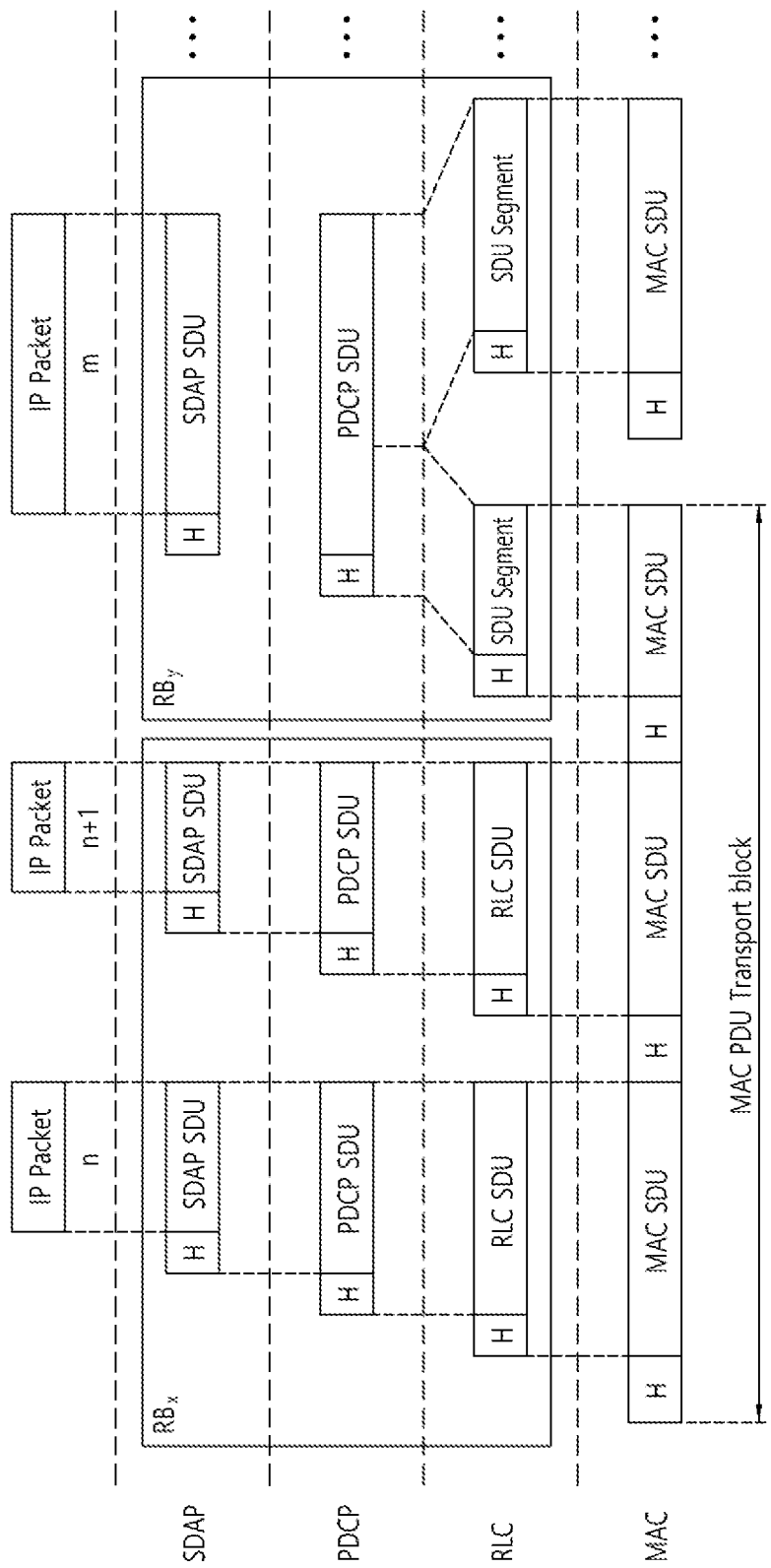
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

In the disclosure, 'mobility' may comprise an idle/inactive mode mobility (e.g., cell reselection) and a connected mode mobility. The idle/inactive mode mobility (e.g., cell reselection) may comprise i) non-equal priority (or, different priority) inter-frequency and inter-RAT cell reselection, and ii) intra-frequency and equal priority inter-frequency cell reselection. The connected mode mobility may comprise a network-based mobility (e.g., legacy mobility) and a UE-based mobility (e.g., conditional mobility).

I. Idle/Inactive Mode Mobility (e.g., Cell Reselection)
1. Reselection Priorities Handling Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e. lower than any of the network configured values). If the UE is configured to perform both NR sidelink communication and V2X sidelink communication, the UE may consider the frequency providing both NR sidelink communication configuration and V2X sidelink communication configuration to be the highest priority. If the UE is configured to perform NR sidelink communication and not perform V2X communication, the UE may consider the frequency providing NR sidelink communication configuration to be the highest priority. If the UE is configured to perform V2X sidelink communication and not perform NR sidelink communication, the UE may consider the frequency providing V2X sidelink communication configuration to be the highest priority.

The frequency only providing the anchor frequency configuration should not be prioritized for V2X service during cell reselection.

When UE is configured to perform NR sidelink communication or V2X sidelink communication performs cell reselection, it may consider the frequencies providing the intra-carrier and inter-carrier configuration have equal priority in cell reselection.

UE may perform a prioritization of frequencies to determine the highest priority frequency among the frequencies.

When UE is configured to perform both NR sidelink communication and V2X sidelink communication, but cannot find a frequency which can provide both NR sidelink communication configuration and V2X sidelink communication configuration, UE may consider the frequency providing either NR sidelink communication configuration or V2X sidelink communication configuration to be the highest priority.

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e. lower than any of the network configured values) while T325 is running irrespective of camped RAT. The UE shall delete the stored deprioritisation request(s) when a PLMN selection or SNPN selection is performed on request by NAS.

UE should search for a higher priority layer for cell reselection as soon as possible after the change of priority. The minimum related performance requirements are still applicable.

The UE shall delete priorities provided by dedicated signalling when:
  the UE enters a different RRC state; or
  the optional validity time of dedicated priorities (T320) expires; or
  the UE receives an RRCRelease message with the field cellReselectionPriorities absent; or
  a PLMN selection or SNPN selection is performed on request by NAS.

In the disclosure, priorities between RATs may be assumed to be different. However, the present disclosure does not exclude the case where priorities between RATs are the same.

The UE shall not consider any black listed cells as candidate for cell reselection.

The UE shall consider only the white listed cells, if configured, as candidates for cell reselection.

The UE in RRC_IDLE state shall inherit the priorities provided by dedicated signalling and the remaining validity time (i.e. T320 in NR and E-UTRA), if configured, at inter-RAT cell (re)selection.

The network may assign dedicated cell reselection priorities for frequencies not configured by system information.

2. Measurement Rules for Cell Re-Selection

Following rules are used by the UE to limit needed measurements:

1> If the serving cell fulfils Srxlev>$S_{IntraSearchP}$ and Squal>$S_{IntraSearchQ}$, the UE may choose not to perform intra-frequency measurements.

1> Otherwise, the UE shall perform intra-frequency measurements.

1> The UE shall apply the following rules for NR inter-frequencies and inter-RAT frequencies which are indicated in system information and for which the UE has priority provided:

2> For a NR inter-frequency or inter-RAT frequency with a reselection priority higher than the reselection priority of the current NR frequency, the UE shall perform measurements of higher priority NR inter-frequency or inter-RAT frequencies.

2> For a NR inter-frequency with an equal or lower reselection priority than the reselection priority of the current NR frequency and for inter-RAT frequency with lower reselection priority than the reselection priority of the current NR frequency:

3> If the serving cell fulfils Srxlev>$S_{nonIntraSearchP}$ and Squal>$S_{nonIntraSearchQ}$, the UE may choose not to perform measurements of NR inter-frequencies or inter-RAT frequency cells of equal or lower priority;

3> Otherwise, the UE shall perform measurements of NR inter-frequencies or inter-RAT frequency cells of equal or lower priority.

1> If the UE supports relaxed measurement and relaxed-Measurement is present in SIB2, the UE may further relax the needed measurements.

3. Criteria for Non-Equal Priority (or, Different Priority) Inter-Frequency and Inter-RAT Cell Reselection If threshServingLowQ is broadcast in system information and more than 1 second has elapsed since the UE camped on the current serving cell, cell reselection to a cell on a higher priority NR frequency or inter-RAT frequency than the serving frequency shall be performed if the cell of a higher priority NR or EUTRAN RAT/frequency fulfils Squal>Thresh$_{X, HighQ}$ during a time interval Treselection$_{RAT}$.

Otherwise, cell reselection to a cell on a higher priority NR frequency or inter-RAT frequency than the serving frequency shall be performed if i) the cell of a higher priority RAT/frequency fulfils Srxlev>Thresh$_{X, HighP}$ during a time interval Treselection$_{RAT}$; and ii) more than 1 second has elapsed since the UE camped on the current serving cell.

If threshServingLowQ is broadcast in system information and more than 1 second has elapsed since the UE camped on the current serving cell, cell reselection to a cell on a lower priority NR frequency or inter-RAT frequency than the serving frequency shall be performed if the serving cell fulfils Squal<Thresh$_{Serving, LowQ}$ and the cell of a lower priority NR or E-UTRAN RAT/frequency fulfils Squal>Thresh$_{X, LowQ}$ during a time interval Treselection$_{RAT}$.

Otherwise, cell reselection to a cell on a lower priority NR frequency or inter-RAT frequency than the serving frequency shall be performed if i) the serving cell fulfils Srxlev<Thresh$_{Serving, LowP}$ and the cell of a lower priority RAT/frequency fulfils Srxlev>Thresh$_{X, LowP}$ during a time interval Treselection$_{RAT}$; and ii) more than 1 second has elapsed since the UE camped on the current serving cell.

Cell reselection to a higher priority RAT/frequency shall take precedence over a lower priority RAT/frequency if multiple cells of different priorities fulfil the cell reselection criteria.

If more than one cell meets the above criteria, the UE shall reselect a cell as follows:

If the highest-priority frequency is an NR frequency, the highest ranked cell among the cells on the highest priority frequency(ies) meeting the cell-ranking criteria;

If the highest-priority frequency is from another RAT, the strongest cell among the cells on the highest priority frequency(ies) meeting the criteria of that RAT.

4. Criteria for Intra-Frequency and Equal Priority Inter-Frequency Cell Reselection The cell-ranking criterion $R_s$ for serving cell and $R_n$ for neighbouring cells is defined by $R_s=Q_{meas,s}+Q_{hyst}-Qoffset_{temp}$ and $R_n=Q_{meas,n}-Qoffset-Qoffset_{temp}$. The parameters related to the cell-ranking criterion are described in table 5:

TABLE 5

| | |
|---|---|
| Q$_{meas}$ | RSRP measurement quantity used in cell reselections. |
| Qoffset | For intra-frequency: Equals to Qoffset$_{s, n}$, if Qoffset$_{s, n}$ is valid, otherwise this equals to zero. For inter-frequency: Equals to Qoffset$_{s, n}$ plus Qoffset$_{frequency}$, if Qoffset$_{s, n}$ is valid, otherwise this equals to Qoffset$_{frequency}$. |
| Qoffset$_{temp}$ | Offset temporarily applied to a cell. |

The UE shall perform ranking of all cells that fulfil the cell selection criterion S.

The cells shall be ranked according to the R criteria specified above by deriving Q$_{meas,n}$ and Q$_{meas,s}$ and calculating the R values using averaged RSRP results.

If rangeToBestCell is not configured, the UE shall perform cell reselection to the highest ranked cell. If this cell is found to be not-suitable, the UE shall behave according to clause 5.2.4.4.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall not consider this cell and, for operation in licensed spectrum, other cells on the same frequency as candidates for reselection for a maximum of 300 seconds.

In all cases, the UE shall reselect the new cell, only if the following conditions are met:

the new cell is better than the serving cell according to the cell reselection criteria specified above during a time interval Treselection$_{RAT}$; and more than 1 second has elapsed since the UE camped on the current serving cell.

If rangeToBestCell is configured but absThreshSS-BlocksConsolidation is not configured on an NR frequency, the UE considers that there is one beam above the threshold for each cell on that frequency.

II. Connected Mode Mobility

1. Network-Based Mobility (e.g., Legacy Mobility)

The network-based mobility is a connected mode mobility in which a network determines a target cell for mobility, and a UE immediately performs a mobility to the target cell upon receiving a mobility command for the target cell from the network.

For example, in the network-based mobility, the UE may transmit a measurement report message to a source RAN node. The measurement report message may comprise a result of measurement on one or more cells including at least one of a source/serving cell related to the source RAN node, or one or more neighbor cells around the UE. The result of measurement may comprise cell quality for the one or more cells. The source RAN node may determine a target cell for mobility among the one or more cells based on the result of measurement in the measurement report. After determining the target cell, the source RAN node may transmit, to the UE, a mobility command (e.g., RRCReconfiguration message) for the target cell. The mobility command for the target cell may comprise access information for accessing to the target cell (e.g., random access configuration including dedicated random access preamble(s) used for random access towards the target cell). Upon receiving the mobility command for the target cell, the UE may perform a mobility to the target cell. The UE may access to the target cell by applying the access information in the mobility command for the target cell.

For example, the network-based mobility may comprise at least one of PCell change (i.e., handover), PSCell addition (i.e., secondary node (SN) addition) or PSCell change (i.e., SN change).

2. UE-Based Mobility (e.g., Conditional Mobility)

The UE-based mobility or conditional mobility is a connected mode mobility in which a network configures a UE with a plurality of candidate cells for mobility, and the UE determines a target cell for mobility which satisfies a mobility execution condition among the plurality of candidate cells. The candidate cells may be a subset of neighbor cells around the UE.

For example, in the UE-based mobility, the UE may receive a message (e.g., conditionalReconfiguration message/RRCReconfiguration message) including a plurality of conditional mobility commands from a source RAN node. Each conditional mobility command may be related to a corresponding candidate cell, and comprise an identity of the conditional mobility command, a mobility execution condition for the corresponding candidate cell, and/or a target cell configuration for the corresponding candidate cell.

The mobility execution condition for a candidate cell may comprise at least one of:
- an event A1 condition that a cell quality of the source/serving cell is higher than a threshold;
- an event A2 condition that a cell quality of the source/serving cell is lower than a threshold;
- an event A3 condition that a cell quality of the source/serving cell is higher than that of the candidate cell by an offset for at least a time-to-trigger (TTT) duration;
- an event A4 condition that a cell quality of the candidate cell is higher than a threshold; or
- an event A5 condition that a cell quality of the source/serving cell is lower than a serving cell threshold and a cell quality of the candidate cell is higher than a neighbor cell threshold for at least a TTT duration.

The target cell configuration for a candidate cell may comprise access information for accessing to the candidate cell (e.g., random access configuration including dedicated random access preamble(s) used for random access towards the candidate cell). The target cell configuration may be a kind of RRCReconfiguration message.

After receiving the plurality of conditional mobility commands, the UE may evaluate mobility execution condition(s) for the candidate cells (i.e., determine whether the mobility execution condition(s) is satisfied for the candidate cells) based on a result of measurement on the candidate cells. If a candidate cell satisfies the mobility execution condition, the UE may consider the candidate cell as a target cell for mobility, and perform a mobility to the target cell based on a conditional mobility command related to the target cell. The UE may access to the target cell by applying a target cell configuration for the target cell in the conditional mobility command.

For example, the UE-based mobility may comprise at least one of conditional PCell change (i.e., conditional handover), conditional PSCell addition (i.e., conditional SN addition) or conditional PSCell change (i.e., conditional SN change).

Hereinafter, non-terrestrial network (NTN) is described.

Figure 10:
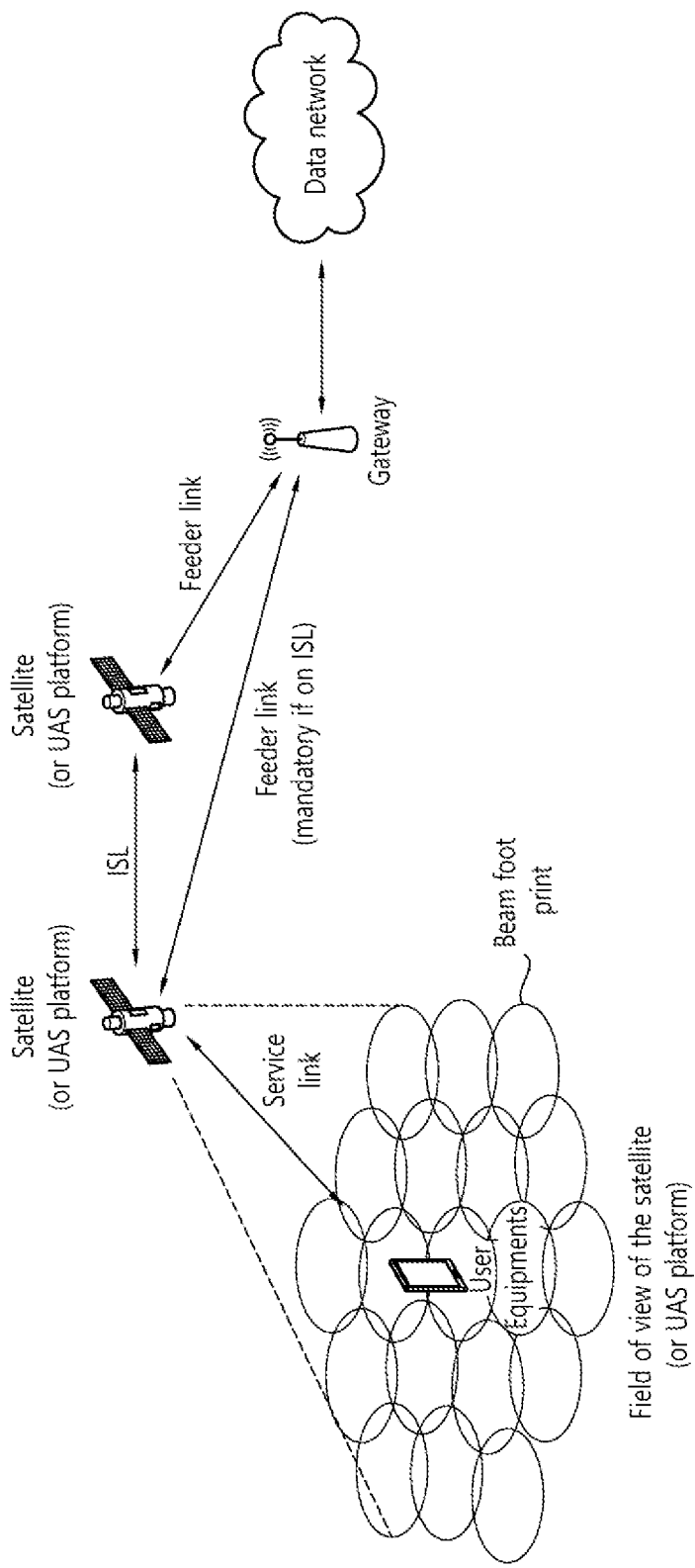
FIG. 10 shows an example of an NTN system to which technical features of the present disclosure can be applied.

FIG. 10 shows an example of an NTN system to which technical features of the present disclosure can be applied.

An NTN may refer to a network, or segment of networks using RF resources on board a satellite (or, unmanned aerial system (UAS) platform). The NTN may provide access to UE.

One or several sat-gateways may connect the NTN to a data network. A geostationary earth orbit (GEO) satellite may be fed by one or several sat-gateways which are deployed across the satellite targeted coverage (e.g. regional or even continental coverage). UE in a cell may be served by only one sat-gateway. A non-GEO satellite may be served successively by one or several sat-gateways at a time. The system may ensure service and feeder link continuity between the successive serving sat-gateways with sufficient time duration to proceed with mobility anchoring and handover.

A feeder link or radio link may be established between a sat-gateway and the satellite (or UAS platform).

A service link or radio link may be established between the user equipment and the satellite (or UAS platform).

A satellite (or UAS platform) may implement either a transparent or a regenerative (with on board processing) payload. The satellite (or UAS platform) may generate several beams over a given service area bounded by a field of view of the satellite. The footprints of the beams (or, beam footprints) may be typically of elliptic shape. The field of view of a satellites (or UAS platforms) may depend on the on board antenna diagram and minimum elevation angle.

A cell of a satellite (e.g., NTN cell) may comprise one or more of all footprints of beams generated by the satellite over a given service area bounded by a field of view of the satellite. The satellite may have/be associated with one or more cells.

A transparent payload may be processed based on radio frequency filtering, frequency conversion and amplification. Hence, the waveform signal repeated by the payload may be un-changed;

A regenerative payload may be processed based on radio frequency filtering, frequency conversion and amplification as well as demodulation/decoding, switch and/or routing, coding/modulation. The processing may be effectively equivalent to having all or part of base station functions (e.g. gNB) on board the satellite (or UAS platform).

Inter-satellite links (ISL) may be established optionally in case of a constellation of satellites. The ISL may require regenerative payloads on board the satellites. ISL may operate in RF frequency or optical bands.

UEs may be served by the satellite (or UAS platform) within the targeted service area.

A service time of a satellite (or, NTN cell) may be a period of time during which a service can be provided by the satellite to a UE via one or more beams in a service area of the satellite (or, in the NTN cell). The service area of the satellite may be bounded by a field of view of the satellite. For example, in idle/inactive mode, a service time of an NTN cell may be a period of time during which a UE can camp on the NTN cell. For another example, in connected mode, a service time of an NTN cell may be a period of time during which a UE can perform a mobility (e.g., handover) and/or random access procedure towards the NTN cell.

The types of satellites (or UAS platforms) are listed in table 7:

TABLE 6

| Platforms | Altitude range | Orbit | Typical beam footprint size |
| --- | --- | --- | --- |
| Low-Earth Orbit (LEO) satellite | 300-1500 km | Circular around the earth | 100-1000 km |
| Medium-Earth Orbit (MEO) satellite | 7000-25000 km | | 100-1000 km |

TABLE 6-continued

| Platforms | Altitude range | Orbit | Typical beam footprint size |
|---|---|---|---|
| Geostationary Earth Orbit (GEO) satellite | 35 786 km | notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

GEO satellite and UAS may be used to provide continental, regional or local service.

A constellation of LEO and MEO may be used to provide services in both northern and southern hemispheres. In some cases, the constellation can even provide global coverage including polar regions. The constellation may require appropriate orbit inclination, sufficient beams generated and inter-satellite links.

Meanwhile, in NTN, LEO satellites revolve around the earth and each LEO satellite has different orbit and cycle of revolution. Therefore, a LEO satellite is visible by a UE on the ground during only a specific time period, which may be called a service time. So even if an NTN cell is measured with good quality, the cell may disappear soon, based on the remaining service time. Therefore, if mobility mechanism which only relies on cell quality is used in NTN, it may increase unnecessary mobility if the remaining service time of the mobility target cell is not enough. As soon as service time of the new serving cell expires, the UE should perform cell reselection to another cell.

Therefore, service time condition should be considered in NTN cell selection/reselection criteria so that UE performs mobility to a cell that can provide enough service time. In the disclosure, a new mobility criterion that utilizes a mobility metric related to expected/remaining service time of a cell is described.

Figure 11:
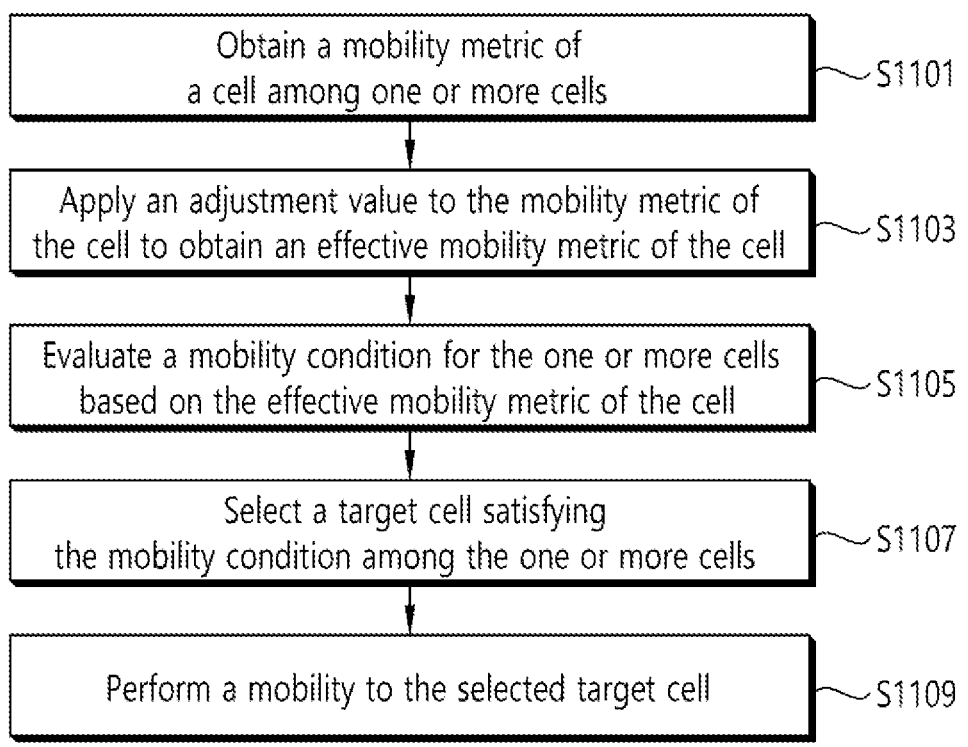
FIG. 11 shows an example of a method performed by a UE according to an embodiment of the present disclosure.

FIG. 11 shows an example of a method performed by a UE according to an embodiment of the present disclosure. The method may also be performed by a wireless device.

Referring to FIG. 11, in step S1101, the UE may obtain a mobility metric of a cell among one or more cells.

In step S1103, the UE may apply an adjustment value to the mobility metric of the cell to obtain an effective mobility metric of the cell. The adjustment value may be related to a remaining service time for the one or more cells.

In step S1105, the UE may evaluate a mobility condition for the one or more cells based on the effective mobility metric of the cell.

In step S1107, the UE may select a target cell satisfying the mobility condition among the one or more cells.

In step S1109, the UE may perform a mobility to the selected target cell.

According to various embodiments, the remaining service time for the one or more cells may comprise a time period from a current time point to an end time point of a service time for the one or more cells. For example, the service time for the one or more cells may comprise a period of time during which a service is provided to the UE by an entity related to the one or more cells in a service area of the entity. For example, the service time for the one or more cells may comprise a period of time during which the UE is able to camp on the one or more cells in an idle mode or an inactive mode. For example, the service time for the one or more cells may comprise a period of time during which the UE is able to perform a mobility or a random access procedure in a connected mode. For example, the service time for the one or more cells may comprise a period of time during which a radio quality for the one or more cells measured by the UE is greater than a configured threshold or a predetermined threshold.

According to various embodiments, the mobility metric of the cell may comprise at least one of a cell ranking of the cell, a measurement quality of the cell or a frequency priority related to the cell. The effective mobility metric of the cell may comprise at least one of: an effective cell ranking of the cell obtained by applying the adjustment value to the cell ranking of the cell; an effective measurement quality of the cell obtained by applying the adjustment value to the measurement quality of the cell; or an effective frequency priority related to the cell obtained by applying the adjustment value to the frequency priority related to the cell.

According to various embodiments, the adjustment value may comprise an offset value added to a mobility metric of a neighbor cell or subtracted from a mobility metric of a serving cell.

According to various embodiments, the offset may be a decreasing function of a remaining service time for the serving cell.

According to various embodiments, the offset value may be zero in a range of a remaining service time for the serving cell being greater than or equal to a threshold value. The offset value is a positive value in a range of the remaining service time for the serving cell being less than the threshold value.

According to various embodiments, the offset value may be a linearly decreasing function of a remaining service time for the serving cell. A gradient of the linearly decreasing function may be a constant value corresponding to the neighbor cell.

According to various embodiments, the offset value may be in inverse proportion to a remaining service time for the serving cell. A proportional factor for the inverse proportion may be a positive constant value corresponding to the neighbor cell.

According to various embodiments, the offset may be a decreasing function of a remaining service time for the neighbor cell.

According to various embodiments, the offset value may be zero in a range of a remaining service time for the neighbor cell being less than a threshold value. The offset value may be a positive value in a range of the remaining service time for the neighbor cell being greater than or equal to the threshold value.

According to various embodiments, the offset value may be a linearly increasing function of a remaining service time for the neighbor cell. A gradient of the linearly increasing function may be a constant value corresponding to the neighbor cell.

According to various embodiments, the offset value may be an increasing function of a proportion of a remaining service time for the neighbor cell to a remaining service time for the serving cell.

According to various embodiments, the offset value may be zero in a range of the proportion being less than a threshold value. The offset value may be a positive value in a range of the proportion being greater or equal to the threshold value.

According to various embodiments, the offset value may be a direct proportion of the proportional factor with a proportional constant corresponds to the neighbor cell.

According to various embodiments, the adjustment value may comprise at least one scaling factor such that a mobility metric of a neighbor cell is multiplied by the scaling factor or a mobility metric of a serving cell is affected by the scaling factor.

According to various embodiments, the scaling factor may be decreasing function of a remaining service time for the serving cell.

According to various embodiments, the scaling factor may be 1 in a range of a remaining service time for the serving cell being greater than or equal to a threshold value. The scaling factor may be a value greater than 1 in a range of the remaining service time for the serving cell being less than the threshold value.

According to various embodiments, the scaling factor may be an increasing function of a remaining service time for the neighbor cell.

According to various embodiments, the scaling factor may be 1 in a range of a remaining service time for the neighbor cell being less a threshold value. The scaling factor may be a value greater than 1 in a range of the remaining service time for the neighbor cell being greater or equal to the threshold value.

According to various embodiments, the adjustment value may comprise an offset value added to the frequency priority related to the cell. The offset value may increase as a remaining service time for the cell increases.

According to various embodiments, the offset value may be zero in a range of the remaining service time for the cell being less than a threshold value. The offset value may be a positive constant value in a range of the remaining service time for the cell being greater than or equal to the threshold value.

According to various embodiments, the offset value may be a linearly increasing function of the remaining service time for the cell in a range of the remaining service time for the cell being greater than or equal to a threshold value. the offset value may be zero in a range of the remaining service time for the cell being less than the threshold value.

According to various embodiments, the mobility may comprise a cell reselection. the target cell may satisfy the mobility condition based on a result of an evaluation that the target cell is one of candidate neighbor cells whose cell ranking is higher than that of a serving cell and a cell ranking of the target cell is highest among the candidate neighbor cells. The result of the evaluation may be determined by comparing the effective cell ranking of the cell with a cell ranking of another cell.

According to various embodiments, the mobility may comprise a cell reselection. The target cell may satisfy the mobility condition based on a result of an evaluation that the target cell is on a frequency whose frequency priority is highest among the one or more cells. The result of the evaluation may be determined by comparing the effective frequency priority related to the cell with a frequency priority related to another cell.

According to various embodiments, the mobility may comprise a conditional mobility. The target cell may satisfy the mobility condition based on a result of an evaluation that: i) the target cell is a neighbor cell whose measurement quality is higher than that of a serving cell; ii) the target cell is a neighbor cell whose measurement quality is highest among the one or more cells; or iii) the target cell is a neighbor cell whose measurement quality is higher than a threshold value configured by a network. The result of the evaluation may be determined by comparing the effective measurement quality of the cell with a measurement quality of another cell.

According to various embodiments, the UE may configure a mobility condition. The UE may measure a quality of a serving cell. The UE may measure a quality of one or more neighbor cells. The UE may calculate a serving time of the serving cell. The UE may determine an effective measurement quality of the neighbor cell. The effective measurement quality may be the sum of the measurement quality of the neighbor cell and an offset value. The offset value may be determined by using the service time of the serving cell. The UE may evaluate the mobility condition by using the effective measurement quality of the measured cell. The UE may select a cell satisfying the mobility condition.

In details below, methods for a UE to perform evaluation of mobility metric for each cell based on at least one of i) measurement quality/frequency priority, or ii) offset value/scaling factor related to a remaining service time for one or more cells are described.

Method 1: Service-Time Dependent Offset Value for Mobility Evaluation

In this method, the following mobility metrics may be used, where neighbor cell specific offsets are applied to the concerned neighbor cells:

$R_S = M_s$; and
$R_n = M_n + O_n$

Alternatively, the following mobility metrics may be used, wherein neighbour cell specific offsets are applied to the concerned serving cell(s):

$R_S = M_s - O_n$; and
$R_n = M_n$.

Alternatively, the following mobility metrics may be used, where a serving cell offset is applied to a serving cell:

$R_S = M_s + O_s$; and
$R_n = M_n$,

Alternatively, the following mobility metrics may be used, where a serving cell offset and neighbour cell specific offsets are applied:

$R_S = M_s + O_s$; and
$R_n = M_n + O_n$.

In the above equations:

'R' denotes a mobility metric which may be considered as a measurement quality/cell ranking;

's' denotes a serving cell;

'n' denotes a neighbor cell;

'$M_s$' denotes a measurement quality/cell ranking of the serving cell (e.g., $Q_{meas,s} + Q_{hyst} - Qoffset_{temp}$). The measurement quality of the serving cell may comprise a cell quality of the serving cell;

'$M_n$' denotes a measurement quality/cell ranking of the neighbor cell (e.g., $Q_{meas,n} - Qoffset - Qoffset_{temp}$). The measurement quality of the neighbor cell may comprise a cell quality of the neighbor cell;

'O' denotes an offset value applied to the measurement quality/cell ranking. The offset value may be determined or affected by a remaining service time for one or more cells. The offset value may be a cell specific or frequency specific value; and Further, the following notation may be used:

Z(x), which may be a value of a function Z that takes expected remaining service time of cell x or similar value as input. For example, Z(x) may denote a remaining service time for cell x.

In the above equations, in case $R_s=M_s+O_s$, the serving cell offset $O_s$ may be determined based on neighbour specific offsets as follows:

$R_s=M_s+/-X(\{O_n\})$, where X(x) is a certain function taking $\{O_n\}$ as its input and $\{O_n\}$ is a set of neighbour cell specific offsets. For example, the function X can be the function take yields the largest value of its input values possibly with an upper bound. For example, the function X can be the function take yields the smallest value of its input values possibly with a lower bound. If $O_n$ is dependent of Z(s) but independent of Z(n), $O_s$ is effectively dependent of Z(s) but independent of Z(n) for any n.

The offset value can be determined as the following alternatives:

Alternative 1: The Offset Value May be a Non-Increasing Function (i.e., Monotone Decreasing Function) of the Remaining Service Time or the Similar Value for the Serving Cell.

In alternative 1, $O_n$ may be desirably a decreasing or non-increasing (i.e., monotone decreasing) function of Z(s). That is, longer remaining service time of a serving cell may yield a smaller offset value, and shorter remaining service time of the serving cell may yield a larger offset value.

For example, in alternative 1-1, if Z(s)≥thres (i.e., threshold value which may be a predetermined value or a value configured by a network), then $O_n$=zero. If Z(s)<thres, then $O_n$ may be a fixed value that is configured or pre-defined.

For example, in alternative 1-2, $O_n=c_n Z(s)$. That is, $O_n$ may be a linearly decreasing function of Z(s) with a gradient $c_n$. $c_n$ may be a constant that may be specific to a cell n. The value of $O_n$ may be upper bounded by $O_n=\max(c_n Z(s), O_{n,max})$, where $O_{n,max}$ may be the maximum allowed value of $O_n$. The value of $O_n$ may be set to zero if Z(s)≥thres, and $c_n Z(s)$ if Z(s)<thres.

For example, in alternative 1-3, $$O_n = c_n \frac{1}{Z(s)}.$$

That is, $O_n$ may be in inverse proportion to Z(s) with a proportional factor $c_n$. The value of $O_n$ may be upper bounded by $$O_n = \max\left(c_n \frac{1}{Z(s)}, O_{n,max}\right).$$

The value of $O_n$ may be set to zero if Z(s)≥thres, and $$c_n \frac{1}{Z(s)}$$

if Z(s)<thres. $c_n$ may be a positive constant that may be specific to a cell n.

Alternative 2: The Offset Value May be a Non-Decreasing Function (i.e., Monotone Increasing Function) of the Remaining Service Time or the Similar Value for the Concerned Neighbor Cell.

In alternative 2, $O_n$ may be desirably an increasing or non-decreasing (i.e., monotone increasing) function of Z(n). That is, longer remaining service time for a neighbor cell may yield larger offset value, and shorter remaining service time for the neighbor cell may yield smaller offset value.

For example, in alternative 2-1, if Z(n)<thres, then $O_n$=zero. If Z(n) thres, $O_n$ may be a fixed value that is configured or pre-defined.

For example, in alternative 2-2, $O_n=c_n Z(n)$. That is, $O_n$ may be a linearly increasing function of Z(n) with a gradient $c_n$. $c_n$ may be a constant that may be specific to a cell n. The value of $O_n$ may be upper bounded by $O_n=\max(c_n Z(n), O_{n,max})$. The value of $O_n$ may be set to zero if Z(n)<thres, and $c_n Z(n)$ if Z(n)≥thres.

For example, in alternative 2-3, $$O_n = c_n \frac{1}{Z(n)}.$$

That is, $O_n$ may be in inverse proportion to Z(n) with a proportional factor $c_n$ so that $O_n$ can monotonically increase with respect to Z(n). The value of $O_n$ may be upper bounded by $$O_n = \max\left(c_n \frac{1}{Z(n)}, O_{n,max}\right).$$

The value of $O_n$ may be set to zero if Z(n)<thres, and $$c_n \frac{1}{Z(n)}$$

it Z(n) thres. $c_n$ may be a positive/negative constant that may be specific to a cell n.

Alternative 3: The Offset Value May be Determined as a Function of a Remaining Service Time for a Serving Cell and a Remaining Service Time for a Neighbor Cell.

For example, in alternative 3-1, $$O_n = c_n \frac{Z(n)}{Z(s)}.$$

That is, $O_n$ may be in direct proportion to Z(n) over Z(s), with a proportional factor $c_n$. The value of $O_n$ may be upper bounded $$O_n = \max\left(O_n = c_n \frac{Z(n)}{Z(s)}, O_{n,max}\right).$$

by the value of $O_n$ may be set to zero if Z(n)<thres, and $$c_n \frac{Z(n)}{Z(s)}$$

if $Z(n) \geq$ thres. $c_n$ may be a positive constant that may be specific to a cell n.

For example, in alternative 3-2, $$O_n = c_n \frac{f_n(Z(n))}{f_s(Z(s))}.$$

That is, $O_n$ is in direct proportion to $f_n(Z(n))$ over $f_s(Z(s))$, with a proportional factor $c_n$. Herein, f(A) is a monotone increasing function used to map the value of A to an intended value range of $O_n$. For example, f(x) is a fixed value for $x \geq x_{th}$, and $f(x)$ is increasing for $x < x_{th}$. Different function $f$ may be defined for each evaluated cell or cell group. $c_n$ may be a positive constant that may be specific to a cell n.

For example, in alternative 3-3, $$O_n = c_n f\left(\frac{Z(n)}{Z(s)}\right).$$

That is, $O_n$ may be linearly increasing with respect to a mapping function $f$ with a gradient $c_n$, and the mapping function $f$ may be a monotone increasing function of $Z(n)$ over $Z(s)$. Herein, f(A) is a monotone increasing function used to map the value of A to an intended value range of $O_n$. For example, f(x) is a fixed value for $x \geq x_{th}$, and $f(x)$ is increasing for $x < x_{th}$. $c_n$ may be a positive constant that may be specific to a cell n.

According to various embodiments, the offset value may be applied to frequency priority values. For example, If $O_n$ is used as a frequency specific offset in case of cell reselection, $O_n$ may correspond to the offset value of a cell that is ranked highest from the R value evaluation. In this case, during the R value evaluation, the offset value may not be taken into account.

Method 2: Service-Time Dependent Scaling Factor for Mobility Evaluation

In this method, the following mobility metrics may be used:

$R_S = M_s$; and
$R_n M_n \gamma_n$

Alternatively, the following mobility metrics may be used:

$R_S = M_s 1/\gamma_n$; and
$R_n = M_n$.

Alternatively, the following mobility metrics may be used:

$R_S = M_s \gamma_s$; and
$R_n = M_n$.

Alternatively, the following mobility metrics may be used:

$R_S = M_s \gamma_s$; and
$R_n M_n \gamma_n$

The scaling factor $\gamma_n$ may be determined by using the alternatives in the method 1, with some modifications.

Alternative 1: The Offset Value May be a Non-Increasing Function of the Remaining Service Time or the Similar Value for the Serving Cell.

In alternative 1, $\gamma_n$ may be desirably a decreasing or non-increasing (i.e., monotone decreasing) function of $Z(s)$. That is, longer remaining service time of a serving cell may yield a smaller offset value, and shorter remaining service time of the serving cell may yield a larger offset value.

For example, in alternative 1-1, if $Z(s) \geq$ thres (i.e., threshold value which may be a predetermined value or a value configured by a network), then $\gamma_n = 1$. If $Z(s) <$ thres, then $O_n$ may be a fixed value that is configured or pre-defined.

For example, in alternative 1-2, $\gamma_n = c_n Z(s)$. That is, $\gamma_n$ may be a linearly decreasing function of $Z(s)$ with a gradient $c_n$. $c_n$ may be a constant that may be specific to a cell n. The value of $\gamma_n$ may be upper bounded by $\gamma_n = \max(c_n Z(s), \gamma_{n,max})$, where $\gamma_{n,max}$ may be the maximum allowed value of $\gamma_n$. The value of $\gamma_n$ may be set to 1 if $Z(s) \geq$ thres, and $c_n Z(s)$ if $Z(s) <$ thres.

For example, in alternative 1-3, $$\gamma_n = c_n \frac{1}{Z(s)}.$$

That is, $\gamma_n$ may be in inverse proportion to $Z(s)$ with a proportional factor $c_n$. The value of $\gamma_n$ may be upper bounded by $$\gamma_n = \max\left(c_n \frac{1}{Z(s)}, \gamma_{n,max}\right).$$

The value of $\gamma_n$ may be set to 1 if $Z(s) \geq$ thres, and $$c_n \frac{1}{Z(s)}$$

if $Z(s) <$ thres. $c_n$ may be a positive constant that may be specific to a cell n.

Alternative 2: The Offset Value May be a Non-Decreasing Function (i.e., Monotone Increasing Function) of the Remaining Service Time or the Similar Value for the Concerned Neighbor Cell.

In alternative 2, $\gamma_n$ may be desirably an increasing or non-decreasing (i.e., monotone increasing) function of $Z(n)$. That is, longer remaining service time for a neighbor cell may yield larger offset value, and shorter remaining service time for the neighbor cell may yield smaller offset value.

For example, in alternative 2-1, if $Z(n) <$ thres, then $\gamma_n = 1$. If $Z(n) \geq$ thres, $\gamma_n$ may be a fixed value that is configured or pre-defined.

For example, in alternative 2-2, $\gamma_n = c_n Z(n)$. That is, $\gamma_n$ may be a linearly increasing function of $Z(n)$ with a gradient $c_n$. $c_n$ may be a constant that may be specific to a cell n. The value of $\gamma_n$ may be upper bounded by $\gamma_n = \max(c_n Z(n), \gamma_{n,max})$. The value of $\gamma_n$ may be set to 1 if $Z(n) <$ thres, and $c_n Z(n)$ if $Z(n) \geq$ thres.

For example, in alternative 2-3, $$\gamma_n = c_n \frac{1}{Z(n)}.$$

That is, $\gamma_n$ may be in inverse proportion to $Z(n)$ with a proportional factor $c_n$ so that $\gamma_n$ can monotonically increase with respect to $Z(n)$. The value of $\gamma_n$ may be upper bounded by $$\gamma_n = \max\left(c_n \frac{1}{Z(n)}, \gamma_{n,max}\right).$$

The value of $\gamma_n$ may be set to 1 if Z(n)<thres, and $$c_n \frac{1}{Z(n)}$$

if Z(n)≥thres. $c_n$ may be a positive/negative constant that may be specific to a cell n.

Alternative 3: The Offset Value May be Determined as a Function of a Remaining Service Time for a Serving Cell and a Remaining Service Time for a Neighbor Cell.

For example, in alternative 3-1, $$\gamma_n = c_n \frac{Z(n)}{Z(s)}.$$

That is, $\gamma_n$ may be in direct proportion to Z(n) over Z(s), with a proportional factor $c_n$. The value of $\gamma_n$ may be upper bounded by $$\gamma_n = \max\left(\gamma_n = c_n \frac{Z(n)}{Z(s)}, \gamma_{n,max}\right).$$

The value of $\gamma_n$ may be set to 1 if Z(n)<thres, and $$c_n \frac{Z(n)}{Z(s)}$$

if Z(n) thres. $c_n$ may be a positive constant that may be specific to a cell n.

For example, in alternative 3-2, $$\gamma_n = c_n \frac{f_n(Z(n))}{f_s(Z(s))}.$$

That is, $\gamma_n$ is in direct proportion to $f_n(Z(n))$ over $f_s(Z(s))$, with a proportional factor $c_n$. Herein, f(A) is a monotone increasing function used to map the value of A to an intended value range of $\gamma_n$. For example, f(x) is a fixed value for $x \geq x_{th}$, and $f(x)$ is increasing for $x<x_{th}$. Different function f may be defined for each evaluated cell or cell group. $c_n$ may be a positive constant that may be specific to a cell n.

For example, in alternative 3-3, $$\gamma_n = c_n f\left(\frac{Z(n)}{Z(s)}\right).$$

That is, $\gamma_n$ may be linearly increasing with respect to a mapping function $f$ with a gradient $c_n$, and the mapping function $f$ may be a monotone increasing function of Z(n) over Z(s). Herein, f(A) is a monotone increasing function used to map the value of A to an intended value range of $\gamma_n$. For example, f(x) is a fixed value for $x \geq x_{th}$, and $f(x)$ is increasing for $x<x_{th}$. $c_n$ may be a positive constant that may be specific to a cell n.

Method 3: Service-Time Dependent Adjustment of Frequency Priority

In this method, if a frequency priority of a serving frequency (i.e., frequency related to a serving cell. If the serving cell is on a frequency, the frequency may be the serving frequency and related to the serving cell) is denoted as $P_s$, the effective frequency priority of the serving frequency $P'_s$ may be expressed as $P'_s = P_s + O_s$. The offset value $O_s$ may monotonically increase as the remaining service time for the serving cell increases. The offset value $O_s$ may be derived by using the alternative 1/alternative 2 (i.e., by setting $O_s$ to the value of $O_n$ derived by using the alternative 1/alternative 2.

For example, if Z(s)<thres, then $O_s$=zero. If Z(s)≥thres, $O_s$ may be a fixed value that is configured or pre-defined.

For example, $O_s = c_s Z(s)$. That is, $O_s$ may be a linearly increasing function of Z(s) with a gradient $c_s$. $c_s$ may be a constant that may be specific to a cell s (i.e., serving cell). The value of $O_s$ may be upper bounded by $O_s = \max(c_s Z(s), O_{s,max})$. The value of $O_s$ may be set to zero if Z(s)<thres, and $c_s Z(s)$ if Z(s)≥thres.

For example, $$O_s = c_s \frac{1}{Z(s)}.$$

That is, $O_s$ may be in inverse proportion to Z(s) with a proportional factor $c_s$ so that $O_s$ can monotonically increase with respect to Z(s). The value of $O_s$ may be upper bounded by $$O_s = \max\left(c_s \frac{1}{Z(s)}, O_{s,max}\right).$$

The value of $O_s$ may be set to zero if Z(s)<thres, and $$c_s \frac{1}{Z(s)}$$

if Z(s)≥thres. $c_s$ may be a positive/negative constant that may be specific to a cell s (i.e., serving cell).

Further, in this method, if a frequency priority of a neighbor frequency (i.e., frequency related to a neighbor cell. If the neighbor cell is on a frequency, the frequency may be the neighbor frequency and related to the neighbor cell) is denoted as $P_n$, the effective frequency priority of the neighbor frequency $P'_n$ may be expressed as $P_n + O_n$. The offset value $O_n$ may monotonically increase as the remaining service time for the neighbor cell increases. The offset value $O_n$ may be derived by using the alternative 2 (i.e., by setting $O_n$ to the value of $O_n$ derived by using the alternative 2).

For example, if Z(n)<thres, then $O_n$=zero. If Z(n)≥thres, $O_n$ may be a fixed value that is configured or pre-defined.

For example, $O_n = c_n Z(n)$. That is, $O_n$ may be a linearly increasing function of Z(n) with a gradient $c_n$. $c_n$ may be a constant that may be specific to a cell n. The value of $O_n$ may be upper bounded by $O_n = \max(c_n Z(n), O_{n,max})$. The value of $O_n$ may be set to zero if Z(n)<thres, and $c_n Z(n)$ if Z(n)≥thres.

For example, $$O_n = c_n \frac{1}{Z(n)}.$$

That is, $O_n$ may be in inverse proportion to Z(n) with a proportional factor $c_n$ so that $O_n$ can monotonically increase with respect to Z(n). The value of $O_n$ may be upper bounded by $$O_n = \max\left(c_n \frac{1}{Z(n)}, O_{n,max}\right).$$

The value of $O_n$ may be set to zero if Z(n)<thres, and $$c_n \frac{1}{Z(n)}$$

if Z(n)≥thres. $c_n$ may be a positive/negative constant that may be specific to a cell n.

Based on the above methods, the UE may perform a mobility (e.g., equal priority cell reselection, non-equal priority cell reselection, and/or conditional mobility).

For example, for equal priority cell reselection, the UE may reselect the best ranked neighbor cell satisfying $R_n > R_s$. That is, the UE may identify candidate neighbor cells whose cell ranking is higher than that of a serving cell, and reselect the best ranked neighbor cell among the identified candidate neighbor cells.

For example, for non-equal priority cell reselection, the UE may reselect a frequency of the highest frequency priority. That is, the UE may reselect a cell on a frequency whose frequency priority is highest.

For example, in the conditional mobility:
the UE may perform a conditional mobility to the cell n satisfying $R_n > R_s$ (e.g., when the mobility execution condition is A3). That is, the UE may perform a conditional mobility to a neighbor cell whose measurement quality is higher than that of a serving cell by at least an offset.
the UE may perform a conditional mobility to a cell n with the highest $R_n$. That is, the UE may perform a conditional mobility to a neighbor cell whose measurement quality is highest among neighbor cells.
the UE may perform a conditional mobility to a cell n with $R_n$>threshold (e.g., when the mobility execution condition is A4). That is, the UE may perform a conditional mobility to a neighbor cell whose measurement quality is higher than a threshold configured by a network.

Various embodiments of the present disclosure are to promote mobility when the expected/remaining service time of its serving cell is small or decreasing.

Various embodiments of the present disclosure are to promote mobility towards a cell when the expected/remaining service time of the cell is larger.

The remaining service time of a cell may be calculated by a UE based on the trajectory of the cell (e.g., ephemeris information for NTN cell or its terrestrial coverage projected from the satellite movement) and/or UE mobility.

Various embodiments of the present disclosure allow UE to reduce the number of executed mobilities by triggering mobility only when necessary or by prioritizing a target cell that is expected to offer a longer service time. The reduced number of mobilities is beneficial for reducing interruption caused by mobility or mobility failure.

Furthermore, the method in perspective of the wireless device described above in FIG. 11 may be performed by first wireless device 100 shown in FIG. 2, the wireless device 100 shown in FIG. 3, the first wireless device 100 shown in FIG. 4 and/or the UE 100 shown in FIG. 5.

More specifically, the wireless device comprises at least one transceiver, at least processor, and at least one computer memory operably connectable to the at least one processor and storing instructions that, based on being executed by the at least one processor, perform operations.

The operations comprise: obtaining a mobility metric of a cell among one or more cells; applying an adjustment value to the mobility metric of the cell to obtain an effective mobility metric of the cell—the adjustment value is related to a remaining service time for the one or more cells; evaluating a mobility condition for the one or more cells based on the effective mobility metric of the cell; selecting a target cell satisfying the mobility condition among the one or more cells; and performing a mobility to the selected target cell.

Furthermore, the method in perspective of the wireless device described above in FIG. 11 may be performed by a software code 105 stored in the memory 104 included in the first wireless device 100 shown in FIG. 4.

More specifically, at least one computer readable medium (CRM) stores instructions that, based on being executed by at least one processor, perform operations comprising: obtaining a mobility metric of a cell among one or more cells; applying an adjustment value to the mobility metric of the cell to obtain an effective mobility metric of the cell—the adjustment value is related to a remaining service time for the one or more cells; evaluating a mobility condition for the one or more cells based on the effective mobility metric of the cell; selecting a target cell satisfying the mobility condition among the one or more cells; and performing a mobility to the selected target cell.

Furthermore, the method in perspective of the wireless device described above in FIG. 11 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus for configured to operate in a wireless communication system (e.g., wireless device) comprises at least processor, and at least one computer memory operably connectable to the at least one processor. The at least one processor is configured to perform operations comprising: obtaining a mobility metric of a cell among one or more cells; applying an adjustment value to the mobility metric of the cell to obtain an effective mobility metric of the cell—the adjustment value is related to a remaining service time for the one or more cells; evaluating a mobility condition for the one or more cells based on the effective mobility metric of the cell; selecting a target cell satisfying the mobility condition among the one or more cells; and performing a mobility to the selected target cell.

The present disclosure can have various advantageous effects.

For example, the UE can reduce the number of executed mobilities by triggering mobility only when necessary or by prioritizing a target cell that is expected to offer a longer service time. The reduced number of mobilities may be beneficial for reducing interruption caused by mobility or mobility failure.

For example, the UE can perform a mobility towards a cell when the expected/remaining service time of the cell is larger.

For example, the mobility may be promoted when the expected/remaining service time of its serving cell is small or decreasing.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) configured to operate in a wireless communication system, the method comprising:
   obtaining a mobility metric of a cell among one or more cells;
   applying an adjustment value to the mobility metric of the cell, wherein the adjustment value is related to a remaining service time for the one or more cells;
   evaluating a mobility condition for the one or more cells based on the mobility metric of the cell to which the adjustment value is applied;
   selecting a target cell satisfying the mobility condition among the one or more cells; and
   performing a mobility to the selected target cell.

2. The method of claim 1, wherein the mobility metric of the cell comprises at least one of a cell ranking of the cell, a measurement quality of the cell or a frequency priority related to the cell,
   wherein the mobility metric of the cell to which the adjustment value is applied corresponds to an effective mobility metric of the cell, and
   wherein the effective mobility metric of the cell comprises at least one of:
   an effective cell ranking of the cell obtained by applying the adjustment value to the cell ranking of the cell;
   an effective measurement quality of the cell obtained by applying the adjustment value to the measurement quality of the cell; or
   an effective frequency priority related to the cell obtained by applying the adjustment value to the frequency priority related to the cell.

3. The method of claim 1, wherein the adjustment value comprises an offset value added to a mobility metric of a neighbor cell or subtracted from a mobility metric of a serving cell.

4. The method of claim 3, wherein the offset is a decreasing function of a remaining service time for the serving cell.

5. The method of claim 4, wherein the offset value is zero in a range of a remaining service time for the serving cell being greater than or equal to a threshold value, and wherein the offset value is a positive value in a range of the remaining service time for the serving cell being less than the threshold value.

6. The method of claim 4, wherein the offset value is a linearly decreasing function of a remaining service time for the serving cell,
   wherein a gradient of the linearly decreasing function is a constant value corresponding to the neighbor cell.

7. The method of claim 4, wherein the offset value is in inverse proportion to a remaining service time for the serving cell,
   wherein a proportional factor for the inverse proportion is a positive constant value corresponding to the neighbor cell.

8. The method of claim 4, wherein the offset is a decreasing function of a remaining service time for the neighbor cell.

9. The method of claim 8, wherein the offset value is zero in a range of a remaining service time for the neighbor cell being less than a threshold value, and
   wherein the offset value is a positive value in a range of the remaining service time for the neighbor cell being greater than or equal to the threshold value.

10. The method of claim 8, wherein the offset value is a linearly increasing function of a remaining service time for the neighbor cell,
    wherein a gradient of the linearly increasing function is a constant value corresponding to the neighbor cell.

11. The method of claim 3, wherein the offset value is an increasing function of a proportion of a remaining service time for the neighbor cell to a remaining service time for the serving cell.

12. The method of claim 11, wherein the offset value is zero in a range of the proportion being less than a threshold value, and
    wherein the offset value is a positive value in a range of the proportion being greater or equal to the threshold value.

13. The method of claim 11, wherein the offset value is a direct proportion of the proportional factor with a proportional constant corresponds to the neighbor cell.

14. The method of claim 1, wherein the adjustment value comprises at least one scaling factor such that a mobility metric of a neighbor cell is multiplied by the scaling factor or a mobility metric of a serving cell is affected by the scaling factor.

15. The method of claim 14, wherein the scaling factor is decreasing function of a remaining service time for the serving cell.

16. The method of claim 15, wherein the scaling factor is 1 in a range of a remaining service time for the serving cell being greater than or equal to a threshold value, and
    wherein the scaling factor is a value greater than 1 in a range of the remaining service time for the serving cell being less than the threshold value.

17. The method of claim 14, wherein the scaling factor is an increasing function of a remaining service time for the neighbor cell.

18. The method of claim 17, wherein the scaling factor is 1 in a range of a remaining service time for the neighbor cell being less a threshold value, and
    wherein the scaling factor is a value greater than 1 in a range of the remaining service time for the neighbor cell being greater or equal to the threshold value.

19. The method of claim 1, wherein the adjustment value comprises an offset value added to the frequency priority related to the cell, and wherein the offset value increases as a remaining service time for the cell increases.

20. The method of claim 1, wherein the UE is in communication with at least one of a network or autonomous vehicles other than the UE.

* * * * *